United States Patent [19]

Bengtsson

[11] 3,991,088

[45] Nov. 9, 1976

[54] HARD FAT PRODUCT

[75] Inventor: Leif Sven Roy Bengtsson, Karlshamn, Sweden

[73] Assignee: AB Karlshamns Oljefabriker, Karlshamn, Sweden

[22] Filed: June 7, 1974

[21] Appl. No.: 477,412

[30] Foreign Application Priority Data

June 8, 1973 Sweden .............................. 7308136

[52] U.S. Cl. .............................. 260/409; 260/410.7; 426/313; 426/607

[51] Int. Cl.[2] ........................ A23D 3/00; A23D 5/00

[58] Field of Search ........... 426/189, 194, 362, 417, 426/339, 340, 606, 607, 629, 601, 313; 260/409, 690, 410.6, 410.7

[56] References Cited

UNITED STATES PATENTS 3,353,964 11/1967 Seiden .............................. 426/194

*Primary Examiner*—A. Louis Monacell
*Assistant Examiner*—R. A. Yoncoskie
*Attorney, Agent, or Firm*—Davis, Hoxie, Faithfull & Hapgood

[57] ABSTRACT

A hard fat product for food purposes, especially for margarine fat blends, from rapeseed oil having a low erucic acid content, and method for producing same.

3 Claims, No Drawings

HARD FAT PRODUCT

This invention relates to a method of preparing a hard fat product, mainly for margarine fat blends, from rapeseed oil with a very low or zero content of erucic acid.

The fat may also be used for other food purposes, such as fat for cake mixes, where the industry has traditionally used rapeseed oils hydrogenated to a melting point in the range of 30°–35° C.

In this description rapeseed oil refers to the oil from the seeds of *Brassica napus* or *Brassica campestris.*

There is no practical difference between these two kinds of oil, and in Canada, for example, most of what is called "rapeseed oil" is oil from the seeds of *Brassica campestris*.

Since World War II, rapeseed oil has reached a growing importance as a fat supply for temperate countries such as Sweden, Poland, Germany, France, Canada and others, partly because of its availability as a domestic raw material and partly because of the fact that intense plant breeding has resulted in high yield strains, making rapeseed an interesting and profitable crop.

Relatively high concentrations of rapeseed oil, both in liquid and hydrogenated form, had regularly been used in margarine production up to 1970. There then arose scientific evidence indicating that a deposition of fat, comprised partly of erucic acid, occurred in the heart tissue and muscles of rats fed a diet having a high rapeseed oil content. Even though no harmful effects had been detected in human beings, the margarine industry voluntarily restricted the use of rapeseed oil in margarine on the basis of the animal studies.

As strains with low or zero content of erucic acid had been produced by plant breeders, these were quickly cultivated on a full scale, and a continuous lowering of the erucic acid content in commercial rapeseed oil has taken place. In Sweden, for example, in 1972 the medium content of erucic acid in rapeseed oil was 18–20%, compared with about 50% in earlier years, and in 1975 it is expected to be less than 5% erucic acid.

Because of its fatty acid composition, including a relatively high (8–10%) content of linolenic acid and only 20–30% linoleic acid, rapeseed oil is not very attractive as a liquid component in margarine, and the industry prefers to use it in its hydrogenated form.

Traditional rapeseed oil, as well as the variations with a medium high (10–20%) content of erucic acid, sometimes called "Mebra", created no difficulties when used in the hydrogenated form. The hydrogenated fat presented melting characteristics high enough for the production of a good margarine, and crystallized in a stable fashion in the $\beta'$ form, and any problems in the transformation of the $\beta'$ type to the $\beta$ form, which can easily cause problems with consistency (so called "sandiness") under prolonged storage, did not occur.

When hydrogenating the new rapeseed oils with low or zero content of erucic acid, called "Lobra" oils, however, it appeared impossible to obtain fats with a dilatation curve steep enough, that is, having rapid melting properties.

Experiments in order to improve this property with different catalysts, temperature and reduced hydrogen supply proved to be without beneficial result.

Experiments with random esterification, either before or after hydrogenation, in order to change the characteristics of the oil also resulted in no improvement, as did experiments with random interesterification with, for example, soybean oil or palm oil.

It is here disclosed that with random interesterification of hydrogenated rapeseed oil having low erucic acid contents with native — that is nonhydrogenated — coconut oil in certain ratios, it is possible to obtain a fat with rapid melting properties, in that the fat exhibits a steep dilatation curve.

At the same time a stable $\beta'$-crystallizing fat is obtained, which when used in margarine does not give rise to any changes in consistency through prolonged storage.

By hydrogenating a rapeseed oil with a low erucic acid content (less than 5%) to an Iodine Value between 30–70, and randomly interesterifying this fat with 10–50% coconut oil, a fat product is obtained having a melting point between 30°–45° C and a dilatation of more than 30 mm³/g at 20° C, but not exceeding 15 mm³/g at 40° C, and a difference of at least 30 mm³/g between the values at 35° C and 20° C.

The dilatations, which are expressed as mm³/g, have been determined according to DGF:s method DGF C IV 3e, which corresponds to tentative A.O.C.S. (American Oil Chemists' Society) method No Cd 10-57.

The effect obtained according to this process is especially surprising in that any similar beneficial effect, that is, increase of the slope of the dilatation curve, compared to what can be obtained directly through hydrogenation, is not obtained by random interesterification of hydrogenated soybean oil or other conventional vegetable oils with coconut oil.

The invention is more specifically described in the examples below.

EXAMPLE 1

A rapeseed oil of the "Lobra" type had the following fatty acid composition, determined by gas-liquid chromatography:

| C14 | C16 | C16:1 | C17 | C18 | C18:1 | C18:2 | C18:3 | C20 | C20:1 | C22 | C22:1 |
|---|---|---|---|---|---|---|---|---|---|---|---|
| 0.2 | 4.4 | 0.3 | 0.1 | 1.4 | 60.0 | 19.5 | 9.3 | 0.6 | 2.1 | 0.2 | 1.8 |

The original Iodine Value of the oil was 112.2.

The oil was hydrogenated with a selective nickel catalyst at a pressure of 0.5 atm gauge and a temperature of 200° C to an Iodine Value of 60.

In spite of these conditions a hydrogenated product was obtained with a very flat melting course, which is illustrated by its dilatation curve compared to that of a traditional hydrogenated rapeseed oil:

| ° C | Lobra mm³/g | traditional rapeseed oil mm³/g |
|---|---|---|
| 10 | 68.7 | 67.0 |
| 20 | 62.4 | 65.5 |
| 30 | 45.2 | 44.7 |
| 35 | 35.1 | 26.5 |

-continued

| °C | Lobra mm³/g | traditional rapeseed oil mm³/g |
|---|---|---|
| 40 | 28.5 | 11.0 |

To a fat charge of 7 tons was then added 3 tons of coconut oil. The mixture was heated to 90° C and then dried for one hour under vacuum. As an interesterification catalyst, 0.3% sodium methylate was added, and the mixture was randomly interesterified.

After 30 minutes the reaction was interrupted, and the catalyst was destroyed and removed by two washings, each with two tons of water. The oil was then dried, post-bleached with 0.2% fullers earth and polished.

The randomly interesterified fat product obtained showed the following dilatations:

| °C | mm³/g |
|---|---|
| 10 | 53.9 |
| 20 | 37.6 |
| 30 | 13.9 |
| 35 | 5.2 |

-continued

| | |
|---|---|
| 40 | 1.0 |

EXAMPLES 2–13

The process according to Example 1 was repeated, but with oils hydrogenated to different Iodine Values and with varying amounts of coconut oil mixed in. The results were as follows:

| Example | Iodine Value (Hydrogenated Lobra) | % Lobra/ Coconut Oil | Dilatation, mm³/g 10° | 20° | 30° | 35° | 40° |
|---|---|---|---|---|---|---|---|
| 2 | 60 | 90/10 | 61.3 | 52.1 | 30.4 | 17.5 | 10.0 |
| 3 | 60 | 80/20 | 58.9 | 46.2 | 21.9 | 10.5 | 3.9 |
| 4 | 60 | 70/30 | 53.9 | 37.6 | 13.5 | 5.2 | 1.1 |
| 5 | 50 | 80/20 | 65.4 | 57.7 | 36.3 | 22.7 | 11.4 |
| 6 | 50 | 70/30 | 61.3 | 49.3 | 24.9 | 12.2 | 4.9 |
| 7 | 50 | 60/40 | 58.7 | 43.2 | 15.7 | 6.4 | 1.6 |
| 8 | 50 | 50/50 | 55.0 | 37.5 | 8.9 | 2.0 | 0.5 |
| 9 | 40 | 70/30 | 68.2 | 61.4 | 41.9 | 27.1 | 14.8 |
| 10 | 40 | 60/40 | 63.6 | 53.7 | 28.9 | 15.6 | 7.4 |
| 11 | 40 | 50/50 | 59.2 | 47.0 | 21.2 | 9.0 | 2.7 |
| 12 | 30 | 60/40 | 68.2 | 62.0 | 40.9 | 23.0 | 15.0 |
| 13 | 30 | 50/50 | 62.9 | 57.0 | 32.5 | 17.0 | 12.1 |

EXAMPLES 14–25

To ascertain the utility of the product in margarine, margarine oil blends with the following compositions (% by weight) were prepared:

| Example | Hard fat according to the invention From example | | Coconut oil % by weight | Liquid vegetable oil | Hydrogenated fat 34° | 37° | 40° | Palm oil | Butter oil |
|---|---|---|---|---|---|---|---|---|---|
| 14 | 2 | 30 | 15 | 35 | 20 | | | | |
| 15 | 3 | 40 | 12 | 27 | 10 | | | 11 | |
| 16 | 4 | 40 | 10 | 20 | | | | 20 | 10 |
| 17 | 5 | 17 | | 31 | 52 | | | | |
| 18 | 6 | 23 | 9 | 26 | 22 | | | 20 | |
| 19 | 7 | 40 | | 40 | | | | 10 | 10 |
| 20 | 8 | 40 | | 25 | 8 | | 10 | 17 | |
| 21 | 9 | 16 | | 31 | 53 | | | | |
| 22 | 10 | 25 | | 33 | 42 | | | | |
| 23 | 11 | 35 | 15 | 30 | 10 | 10 | | | |
| 24 | 12 | 16 | | 32 | 52 | | | | |
| 25 | 13 | 30 | 15 | 30 | 25 | | | | |

Margarine was produced in the usual manner from the fat blends described above.

The taste of the products was without objection and was in some cases judged better than that of comparison blends produced solely with traditional components.

The samples were subjected to prolonged storage and the products were judged organoleptically, as well as through X-ray crystallographic examinations of the polymorphism.

An ascending scale with 7 degrees was used for the test and the results are summarized below (the figures within brackets indicate average values for factory-made products).

| Storage time (weeks) | Taste | Appearance | Consistency | Crystal form |
|---|---|---|---|---|
| 0 | 4.5-5.5 (5.0) | 4.4-5.5 (5.0) | 4.2-5.3 (4.8) | β' |
| 3 | 4.2-5.1 (4.6) | 4.3-5.3 (5.0) | 4.2-5.1 (4.8) | β' |

-continued

| Storage time (weeks) | Taste | Appearance | Consistency | Crystal form |
|---|---|---|---|---|
| 6 | 3.9-4.9 (4.4) | 4.4-5.3 (5.0) | 4.0-5.2 (4.8) | β' |

I claim:

1. A rapid melting, hard fat product mainly for use in margarine fat blends, consisting essentially of a hydrogenated rapeseed oil, interesterified with from 10 to 50% coconut oil, said rapeseed oil being characterized in that in its natural state it has an erucic acid content of less than about 5%, said rapeseed oil being hydrogenated to an Iodine Value of between about 30 and about 70, said interesterified product exhibiting a slip melting-point between about 30° C and about 45° C and a dilatation of more than 30 mm$^3$/g at 20° C but not exceeding 15 mm$^3$/g at 40° C, and a difference of at least 30 mm$^3$/g between the values at 35° C and 20° C.

2. The fat product claimed in claim 1 and in which the difference between the dilatation values at 35° and 20° C is at least 35 mm$^3$/g.

3. A method for producing a rapid melting hard fat product mainly for use in margarine fat blends comprising the steps of hydrogenating a rapeseed oil with an erucic acid content of less than 5% to a Iodine Value between 30 to 70, and randomly interesterifying the hydrogenated product with 10–50% coconut oil, so that a fat product is obtained having a slip melting-point between 30°–45° C and a dilatation of more than 30 mm$^3$/g at 20° C, but not exceeding 15 mm$^3$/g at 40° C, and a difference of at least 30 mm$^3$/g between the values at 35° C and 20° C.

* * * * *